(12) United States Patent
Widzgowski

(10) Patent No.: US 7,676,071 B2
(45) Date of Patent: Mar. 9, 2010

(54) METHOD FOR ILLUMINATING A SAMPLE

(75) Inventor: Bernd Widzgowski, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 980 days.

(21) Appl. No.: 11/367,522

(22) Filed: Mar. 3, 2006

(65) Prior Publication Data

US 2006/0232843 A1    Oct. 19, 2006

(30) Foreign Application Priority Data

| Mar. 4, 2005 | (DE) | ........................ | 10 2005 010 490 |
| Oct. 7, 2005 | (DE) | ........................ | 10 2005 048 481 |
| Jan. 10, 2006 | (DE) | ........................ | 10 2006 001 247 |

(51) Int. Cl.
*G06K 9/00* (2006.01)

(52) U.S. Cl. ..................................... 382/128

(58) Field of Classification Search .................. 382/128
See application file for complete search history.

(56) References Cited

U.S. PATENT DOCUMENTS 4,907,158 A    3/1990    Kettler et al.

6,898,004 B2 *    5/2005    Shimizu et al. ............. 359/385
2003/0179445 A1    9/2003    Maenle et al.

FOREIGN PATENT DOCUMENTS

| EP | 1 085 292 A1 | 3/2001 |
| WO | WO-2005/017597 A1 | 2/2005 |

* cited by examiner

*Primary Examiner*—Tom Y Lu
(74) *Attorney, Agent, or Firm*—Darby & Darby

(57) ABSTRACT

A method for illuminating a specimen or a region of the specimen (region of interest, ROI), the information indicating whether and in what manner a specific point on the specimen is to be illuminated, being stored in a data memory under a specific address. A change in the position, orientation, and/or shape of the specimen is captured, and a transformation of the coordinates of the image points to be illuminated is derived therefrom; memory addresses are uniquely assigned to the transformed coordinates; and, on the basis of the memory addresses, the data memory is accessed, and its contents is read out in order to control the light source.

17 Claims, 1 Drawing Sheet

METHOD FOR ILLUMINATING A SAMPLE

CROSS REFERENCE TO RELATED APPLICATIONS

Priority is claimed to German patent application DE 10 2005 010 490.8, filed Mar. 4, 2005, German patent application DE 10 2005 048 481.6 filed Oct. 7, 2005, and German patent application DE 10 2006 001 427.8 filed Jan. 10, 2006.

FIELD

The present invention relates to a method for illuminating a specimen or a region of the specimen (region of interest, ROI), the information indicating whether and in what manner a specific point on the specimen is to be illuminated, being stored in a data memory under a specific address.

BACKGROUND

Methods for illuminating a specimen are used in the field, in particular in confocal microscopy. In this context, a specimen is scanned by a mostly laser-produced light beam in a line-by-line or meander pattern. However, in order to avoid damaging the specimen, only specific specimen regions, the regions of interest (ROIs), are illuminated. Since the light beam, conditionally upon the inertia of the light beam deflection, sweeps over the entire specimen, its intensity is modulated as a function of the position on the specimen. The information indicating whether a point of a specimen is to be illuminated is stored in a memory and is read out from the same on the basis of the light beam position. The control data are then fed to the light modulator.

If the illuminated specimen is made up of cells in an aqueous solution, for example, then the position, orientation, and shape of the specimen or of the ROI do not remain constant. The changes in the specimen are mapped by adapting the intensity data in the memory. In the process, however, it may be necessary to update large areas of the memory. However, since the process of updating the memory contents and reading out from the same must take place in parallel and in real time, rigorous demands are placed on the speed of the memory used.

This becomes especially problematic when specimens are to be scanned at a high frame rate. In such a case, the available memories quickly reach their performance limits and become very costly. In addition, very high-performance processors are needed for computing the new memory contents.

In a schematic representation, FIG. 1 shows the logical sequence of an illuminating method. In this case, the deflecting electronics of laser beam 1, which controls the position of the laser beam on the specimen for scanning the same in a line-by-line pattern, generates a value for x-position 2 and for y-position 3 of the laser beam. These two values are supplied to an address generator 4, which, in turn, from these values, generates a memory address 5 in memory 6. Intensity data 7, which are used to influence the intensity of the light beam via interface 8, driver 9, and crystal 10, are stored in memory 6. Interface 8, driver 9 and crystal 10 may be AOTF components. In this method, a change in the specimen or in a region of the specimen is mapped in an adaptation 11 of the contents of memory 6.

SUMMARY

An aspect of the present invention is to devise a method for illuminating a specimen or a region of a specimen, which will allow for spatial changes in the specimen or in parts of the specimen, while simultaneously placing as few demands as possible on the hardware used.

In an embodiment, the present invention provides a method for illuminating a specimen or a region of interest (ROI) of the specimen with a light source. The method includes storing information indicating whether and in what manner each of a plurality of image points on the specimen is to be illuminated in a data memory under a specific address. A change in at least one of the position, orientation and shape of the specimen resulting from movements inside the specimen is recorded as at least one image. A transformation of coordinates of the image points is derived from the at least one recorded image using an image processing system. Unique memory addresses are assigned to the transformed coordinates. The data memory is accessed on the basis of the memory addresses and the contents of the data memory are read out so as to control the light source.

BRIEF DESCRIPTION OF THE DRAWINGS

Exemplary embodiments of the present invention are described in the following and schematically shown in the drawings, in which.

DETAILED DESCRIPTION

Figure 1:
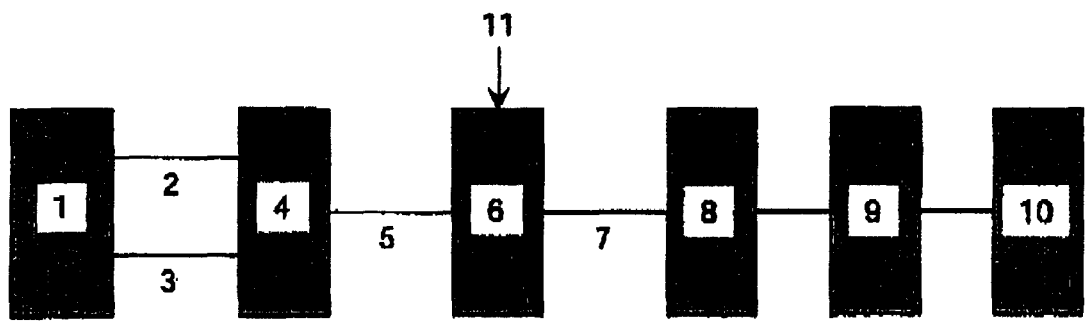
FIG. 1 shows, in a schematic representation, the functional sequence of the known standard method.

With the present invention there is no need to update the entire memory contents in order to update the parameters for controlling the light source. Rather, in accordance with the present invention, the changes in the specimen or in the ROI may be mapped by changing the transformation rules. In accordance with an embodiment of the present invention, these transformation rules are used to adapt the coordinates of the image points to be illuminated to the changes in the specimen or the ROI. Memory addresses, which may be used for accessing the data memory, may then be uniquely assigned to the transformed coordinates of the image points to be illuminated. Finally, the information for controlling the light source may be read out from the selected memory locations.

The change in the position, orientation and/or shape of the specimen advantageously results in a translation, a rotation, a compression and/or an expansion of the specimen itself. The shape of the specimen may change on its own. In such a case, the change in the ROI would be a reaction to the same.

The changes may preferably be reproduced by transforming the coordinates of the image points to be illuminated through the use of conformal mappings. In this context, translations, rotations and scalings are preferably used. By performing these transformations, the currently active specimen structure is generally transformed point for point into an image region of the ROI or into a reference image. In both cases, it is a question of reference regions or reference points that are mostly defined at the beginning of the measurement.

The method according to the present invention may advantageously be applied to specimens having a plurality of ROIs. The change in each individual ROI is reproduced by using a separate transformation rule, each individual transformation rule generally being differently parameterized and/or being able to be differently constructed. Thus, one transformation rule may merely include a translation, while another transformation rule is composed of a translation, a rotation, and a scaling.

To achieve a simple and practical mode of operation, the parameters of the individual transformations may preferably be adapted automatically, continuously and/or in real time to the changes in the specimen or in the ROI. Images of the specimen or of parts of the specimen could be captured in time sequence. The changes may be recorded using a camera or a scanner, for example. The recorded images are subsequently analyzed using an image processing system. The data are fed to a further system for determining the altered parameters of the transformation. The parameters are preferably stored in registers, whose contents may be used by the systems for transforming the coordinates of the points to be illuminated.

An embodiment of the invention provides for the data memory to be preferably subdivided into a plurality of memory areas, all or at least some of the ROIs of a specimen being mapped into separate memory areas. Preferably, the memory areas are not only logically, but also physically separated from one another. Thus, for each ROI, the individual transformations may be performed completely independently and, in particular, not as mutually blocking operations.

With regard to controlling the light source, on the one hand, the intensity may be changed; on the other hand, the spectrum and/or the shape of a light bundle emitted by the light source may be influenced. The individual parameters used for controlling the light source are stored in the data memory and are preferably not changed during the execution time or, at least, not for the duration of a few scanning cycles.

A change in the specimen or the ROI may result in overlapping ROIs. In such a case, a separate set of parameters for controlling the light source is defined for each ROI, and the value used for controlling the light source is ascertained by averaging or summing the individual values. In the summation operation, in particular, to avoid an unacceptably high light intensity, the individual parameters are limited to a range between a minimum and a maximum value.

To facilitate integration of a system for carrying out the method according to the present invention, it may be readily implemented in a CPLD or FPGA module having a plurality of internal memories. This makes it possible for the architecture of a high-performance unit to include a plurality of parallel processors. The process of transforming the coordinates of the points to be illuminated may be implemented very advantageously using digital signal processors which are likewise able to be integrated into the modules mentioned.

Figure 2:
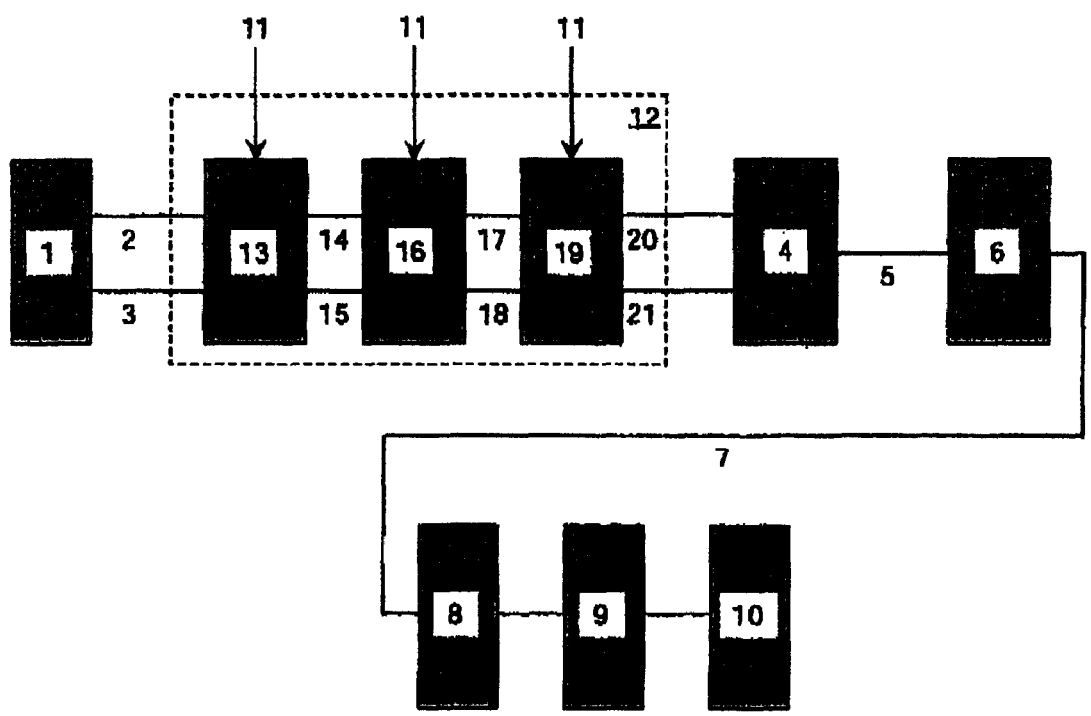
FIG. 2 schematically illustrates the functional sequence of the method according to the present invention.

An embodiment of a method according to the present invention is schematically illustrated in an implementation in FIG. 2. The same reference numerals as in FIG. 1 have been used for equivalent components. Here as well, the deflecting electronics of laser beam 1 supplies the two values for x-position 2 and for y-position 3 of the laser beam, which are used as the starting point for the process. The resulting, defined laser beam position then undergoes an affine mapping 12, which, in this case, includes a translation 13, a rotation 16, and a scaling 19. The values obtained from translation 13 for x-position 14 and y-position 15 are subjected to a rotation 16, which yields further transformed values for x-position 17 and y-position 18. The subsequent scaling operation yields the fully transformed values for x-position 20 and y-position 21 following the affine mappings, which are then assigned, in turn, by an address generator 4 to an address 5. Finally, this address 5 is used to access memory 6, and intensity data 7 contained therein are read out. These intensity data 7 are used to influence the intensity of the light beam, again via an interface 8, a driver 9, and a crystal 10. In this connection, the change in the specimen or in individual regions of the specimen is reproduced in an adaptation 11 of the individual affine mappings 12.

With regard to other advantageous embodiments of the method according to the present invention, to avoid repetitive explanations, reference is made to the general portion of the specification and to the appended claims. Finally, it is particularly noted that the exemplary embodiment described above is merely intended for purposes of exemplifying the claimed teaching, but not for limiting it to such exemplary embodiment.

LIST OF REFERENCE NUMERALS 1. deflecting electronics of the laser beam
2. x-position of the laser beam
3. x-position of the laser beam
4. address generator
5. address
6. memory
7. intensity data
8. interface
9. driver
10. crystal
11. adaptation
12. affine mappings
13. translation
14. x-position following translation
15. y-position following translation
16. rotation
17. x-position following translation and rotation
18. y-position following translation and rotation
19. scaling
20. x-position following the affine mappings
21. y-position following the affine mappings

The invention claimed is:

1. A method for illuminating a specimen or a region of interest (ROI) of the specimen with a light source, the method comprising:
   storing information indicating whether and in what manner each of a plurality of image points on the specimen is to be illuminated in a data memory under a specific address,
   recording, as at least one image, a change in at least one of the position, orientation and shape of the specimen resulting from movements inside the specimen;
   deriving a transformation of coordinates of the image points from the at least one recorded image using an image processing system;
   assigning unique memory addresses to the transformed coordinates; and,
   accessing the data memory on the basis of the memory addresses and reading out contents of the data memory so as to control the light source.

2. The method as recited in claim 1, wherein the change in at least one of the position, orientation and shape of the specimen results in at least one of a translation, a rotation, a compression and an expansion of the specimen.

3. The method as recited in claim 1, wherein the change in the position, orientation, and/or shape of the specimen or of the ROI is reproduced by transforming the coordinates of the image points to be illuminated.

4. The method as recited in claim 1, wherein the transformation includes conformal mappings, in particular translations, rotations and scalings.

5. The method as recited in claim 1, wherein, by performing the transformation, the coordinates of the image points to be illuminated are generally transformed into points in the image region of the ROI or in a reference image.

6. The method as recited in claim 1, wherein the specimen includes a plurality of ROIs.

7. The method as recited in claim 1, wherein a separate transformation rule is created for each ROI, the individual transformation rules generally being differently constructed and parameterized.

8. The method as recited in claim 1, wherein the parameters of the transformation are adapted at least one of automatically, continuously and in real time to the change in the specimen or in the ROI.

9. The method as recited in claim 1, wherein images of the specimen or of parts of the specimen are captured in time sequence using a camera, and the recorded images are analyzed by using an image processing system in order to determine the changed parameters using the image processing system.

10. The method as recited in claim 1, wherein the parameters of the transformation are exchanged via shared registers, between the system for determining the altered parameters and the transformation system.

11. The method as recited in claim 1, wherein the data memory is subdivided into a plurality of memory areas, and at least some of the ROIs of a specimen are mapped into separate memory areas.

12. The method as recited in claim 1, wherein the process of controlling the light source includes changing at least one of an intensity, spectrum and shape of a light bundle emitted by the light source.

13. The method as recited in claim 1, wherein individual parameters used for controlling the light source are stored in the data memory.

14. The method as recited in claim 1, wherein, in a case of overlapping ROIs, a set of parameters for controlling the light source is defined for each of the overlapping ROIs, and the light source is controlled on the basis of the average value or the sum of the individual values.

15. The method as recited in claim 1, wherein an ascertained parameter for controlling the light source is limited to a range between a minimum and a maximum value.

16. The method as recited in claim 1, wherein, in a case of overlapping ROIs, an ascertained parameter for controlling the light source is limited to a range between a minimum and a maximum value.

17. The method as recited in claim 13 wherein the stored individual parameters used for controlling the light source are unchanged during a plurality of scanning cycles.

* * * * *